(12) United States Patent
Lloyd et al.

(10) Patent No.: US 11,687,337 B2
(45) Date of Patent: Jun. 27, 2023

(54) PROCESSOR OVERRIDING OF A FALSE LOAD-HIT-STORE DETECTION

(71) Applicant: INTERNATIONAL BUSINESS MACHINES CORPORATION, Armonk, NY (US)

(72) Inventors: Bryan Lloyd, Austin, TX (US); Brian Chen, Austin, TX (US); Kimberly M. Fernsler, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/445,541

(22) Filed: Aug. 20, 2021

(65) Prior Publication Data
US 2023/0056077 A1 Feb. 23, 2023

(51) Int. Cl.
*G06F 9/38* (2018.01)
*G06F 9/30* (2018.01)

(52) U.S. Cl.
CPC ........ *G06F 9/30043* (2013.01); *G06F 9/3836* (2013.01)

(58) Field of Classification Search
None
See application file for complete search history.

(56) References Cited

U.S. PATENT DOCUMENTS

| | | | |
|---|---|---|---|
| 6,021,485 A * | 2/2000 | Feiste ..................... | G06F 9/384 712/216 |
| 10,209,995 B2 | 2/2019 | Chadha | |
| 10,534,616 B2 | 1/2020 | Gonzalez | |
| 10,929,142 B2 | 2/2021 | Alexander | |
| 2006/0106987 A1* | 5/2006 | Barrick ................. | G06F 9/3838 712/E9.047 |
| 2011/0185158 A1* | 7/2011 | Alexander ............ | G06F 9/3838 712/E9.016 |
| 2013/0073833 A1* | 3/2013 | Konigsburg .......... | G06F 9/3834 712/216 |
| 2013/0326198 A1* | 12/2013 | Meier ................... | G06F 9/3834 712/216 |

(Continued)

OTHER PUBLICATIONS

Author Unknown, "System and Method for Adaptive Automatic Classification of Intrusion Detection Events," IP.com, IP.com No. IPCOM000020107D, IP.com Publication Date: Oct. 27, 2003, 6 pgs.

(Continued)

*Primary Examiner* — Hyun Nam
(74) *Attorney, Agent, or Firm* — Caleb D. Wilkes

(57) ABSTRACT

A method for operation of a processor core is provided. A rejected first load instruction is received that has been rejected due to a false load-hit-store detection against a first store instruction. A warning label is generated on a basis of the false load-hit-store detection. The warning label is added to the received first load instruction to create a labeled first load instruction. The labeled first load instruction is issued such that the warning label causes the labeled first load instruction to bypass the first store instruction in the store reorder queue and thereby avoid another false load-hit-store detection against the first store instruction. A computer system and a processor core configured to operate according to the method are also disclosed herein.

20 Claims, 4 Drawing Sheets

(56) References Cited

U.S. PATENT DOCUMENTS

| | | | | |
|---|---|---|---|---|
| 2014/0075158 A1* | 3/2014 | Indukuru | ............... | G06F 9/3834 |
| | | | | 712/216 |
| 2014/0189250 A1* | 7/2014 | Kosinski | ............. | G06F 12/0895 |
| | | | | 711/138 |
| 2014/0201838 A1* | 7/2014 | Varsanyi | ............... | G06F 21/552 |
| | | | | 726/23 |
| 2017/0004085 A1* | 1/2017 | Guthrie | ................. | G06F 12/084 |
| 2017/0351522 A1* | 12/2017 | Ayub | ..................... | G06F 9/3834 |
| 2019/0220279 A1* | 7/2019 | McNeeney | ......... | G06F 9/30043 |
| 2020/0301710 A1 | 9/2020 | Alexander | | |
| 2023/0056077 A1* | 2/2023 | Lloyd | ................... | G06F 9/3838 |

OTHER PUBLICATIONS

Bell, et al., "Automatic Testcase Synthesis and Performance Model Validation for High-Performance PowerPC Processors," IEEE Xplore, 2006, Downloaded Jul. 12, 2021, 12 pgs.

Disclosed Anonymously, "Improving Multi-Threaded Technology Based Processor Performance By Removing False Sharing and Enabling Global Store to Load Forwarding," IP.com, IP.com No. IPCOM000021030D, IP.com Publication Date: Dec. 17, 2003, 4 pgs.

Disclosed Anonymously, "Tuning Microprocessor Cache Hit Rate to Provide Better Cyber Security Protection," P.com, IP.com No. IPCOM000264189D, IP.com Publication Date: Nov. 19, 2020, 3 pgs.

Herten, "Performance Counters and Tools," OpenPOWER Tutorial, SC16, Salt Lake City, Nov. 14, 2016, 96 pgs.

* cited by examiner

PROCESSOR OVERRIDING OF A FALSE LOAD-HIT-STORE DETECTION

BACKGROUND

The present invention relates generally to processors that are used in computer systems and that read and execute software code that is input into the processors.

SUMMARY

According to one exemplary embodiment, a method for operation of a processor core is provided. A rejected first load instruction is received that has been rejected due to a false load-hit-store detection against a first store instruction. A warning label is generated on a basis of the false load-hit-store detection. The warning label is added to the received first load instruction to create a labeled first load instruction. The labeled first load instruction is issued such that the warning label causes the labeled first load instruction to bypass the first store instruction in the store reorder queue and thereby avoid another false load-hit-store detection against the first store instruction. A computer system and a processor core configured to operate according to the method described above are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
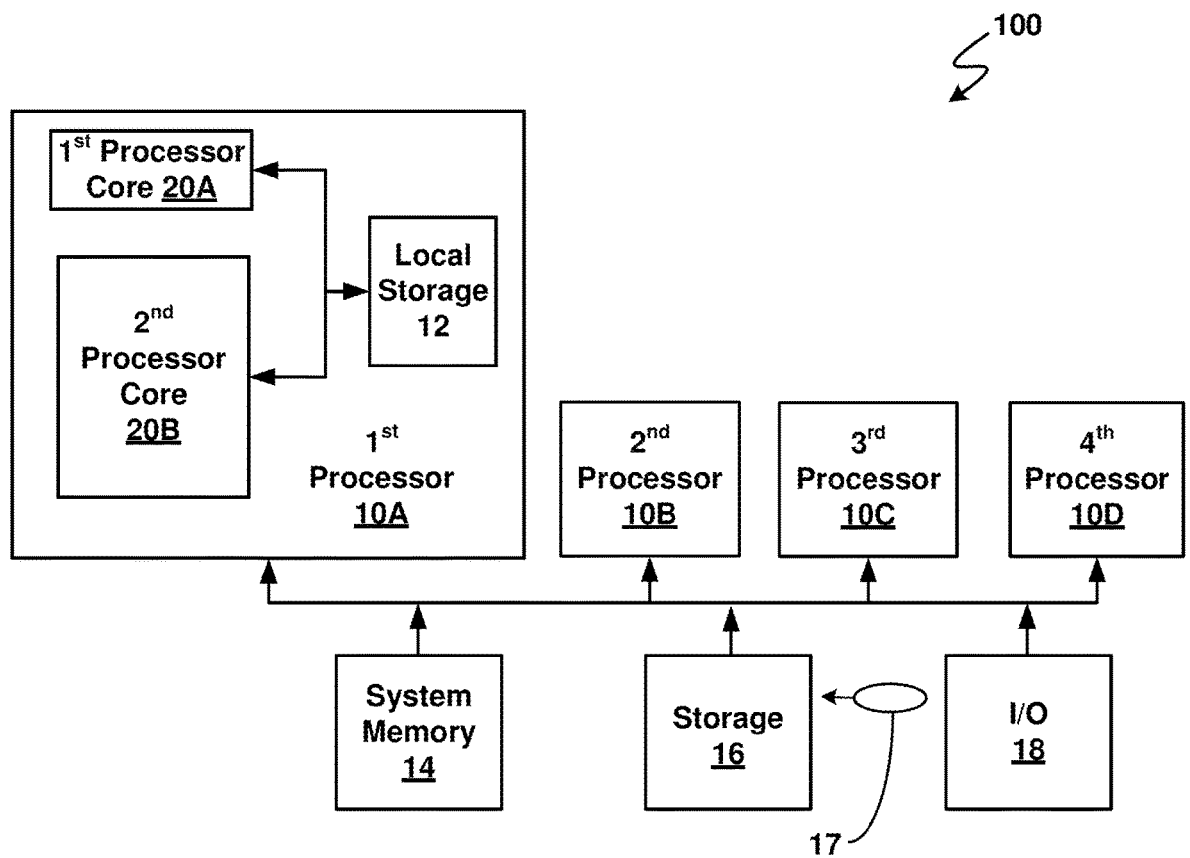
FIG. 1 is a block diagram illustrating a processing system in accordance with at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a processor, a computer system, and a method for operation of a processor which improve processing when false load-hit-store detection occurs. In a typical high performance processor that has demanding frequency and latency goals to be met, load-hit-store protection is commonly determined based on a partial effective address. A load-hit-store detection based on a partial effective address is used to drive the critical reading of store forward data out of the store reorder queue onto the load result bus. In parallel to a timing-critical read of the store forward data onto the load result bus, a more thorough check of the translated full real address of the load instruction is performed against the full real address of the store instruction whose entry in the store reorder queue was hit. This more thorough check is done to ensure that the load instruction and the store instruction truly match. The full address of the load instruction and the full address of the store instruction not fully matching and only partially matching is a false load-hit-store condition and requires the load instruction to be handled in a special way. False load-hit-stores often incur a performance penalty. For example, the load instruction that has falsely hit the store instruction is rejected and is not reissued until the hit store instruction drains from the store reorder queue. The rejection may incorporate a retrying and/or a reissuing. If a large block of memory is being copied in a loop and the load instructions continually match with their partial effective addresses against older store instructions in the store reorder queue that are from previous loop iterations, a large performance penalty is incurred. When the relevant memory location for the store instructions causing this false matching are, in reality, not matching the memory location accessed by the load instruction, this delay to wait for execution of the store instruction should be avoided so that this performance penalty may be avoided.

The present embodiments help avoid this performance penalty and improve processing speed. Thus, a computer system with the improved processor described herein more quickly executes and performs instructions of software code. The described embodiments may improve processing performance and processing speed for out-of-order processors.

Figure 2:
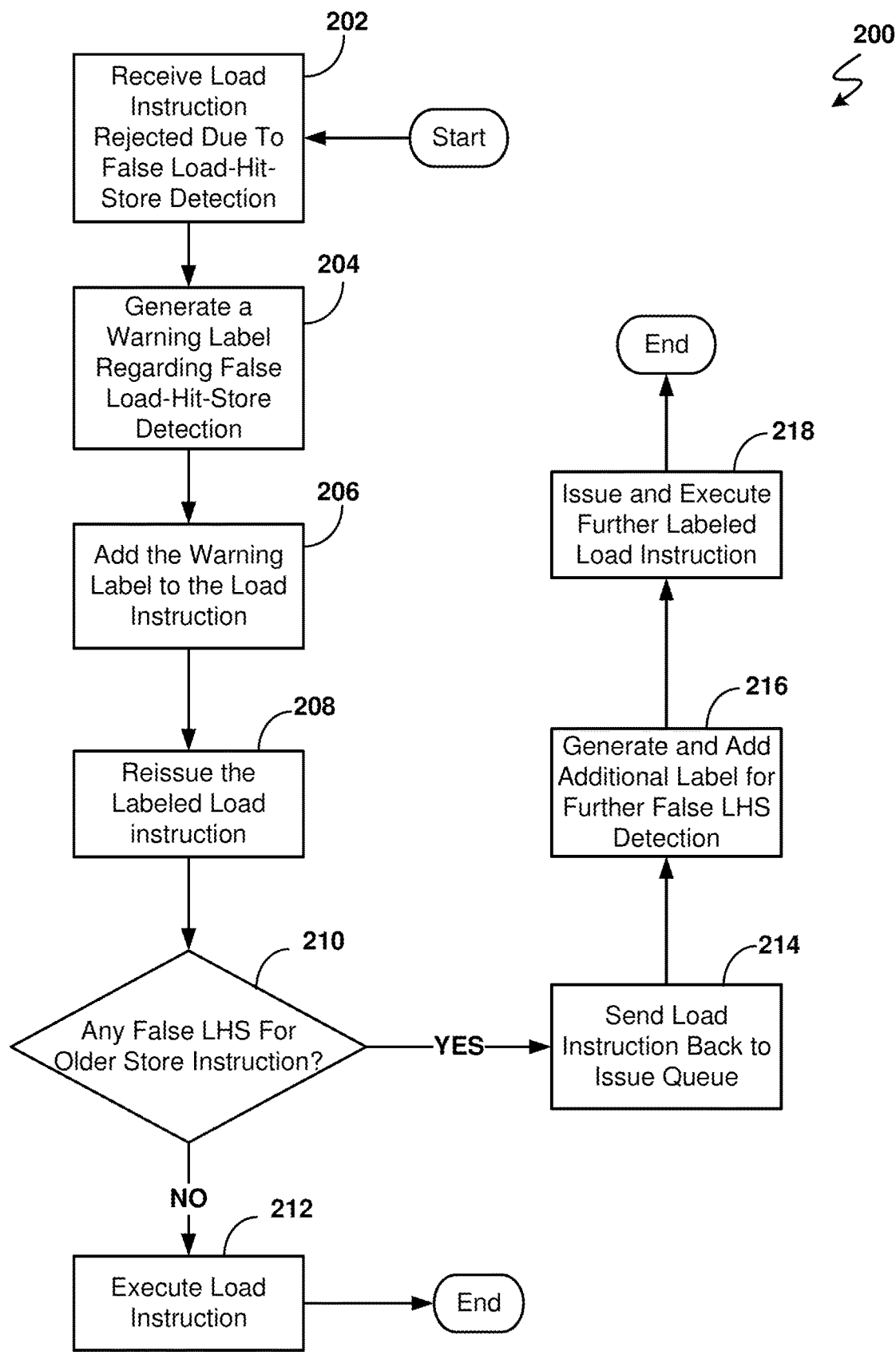
FIG. 2 is an operational flowchart illustrating a false load-hit-store detection override process according to at least one embodiment.

Referring now to FIG. 1, a processing system 100 in accordance with an embodiment of the present invention is shown. The processing system 100 that is depicted includes a number of processors including a first processor 10A, a second processor 10B, a third processor 10C, and a fourth processor 10D. Each of the first processor 10A, the second processor 10B, the third processor 10C, and the fourth processor 10D may be designed and have components in conformity with one or more of the present embodiments, for example may be designed and have components in conformity with the false LHS overriding processor core 32 shown in FIG. 3 and that is configured to perform the false load-hit-store detection override process that is shown in FIG. 2. The processing system 100 that is depicted with multiple processors is illustrative. Other processing systems in accordance with other embodiments may include a single processor having symmetric multi-threading (SMT) cores. The first processor 10A includes a first processor core 20A, a second processor core 20B, and a local storage 12, which may be a cache level, or a level of internal system memory. The second processor 10B, the third processor 10C, and the fourth processor 10D may have similar internal components or the same design of internal components as the first processor 10A. The first processor 10A, the second processor 10B, the third processor 10C, and the fourth processor 10D are coupled to a main system memory 14 and to a storage subsystem 16, which includes non-removable drives and optical drives, for reading a first portable computer-readable tangible storage device 17. The processing system 100 also includes input/output (I/O) interfaces and devices 18 such as mice and keyboards for receiving user input and graphical displays for displaying information. The various processors described may be microprocessors.

As will be discussed with reference to FIG. 4, the processing system 100 may also include internal components 902a and external components 904a, respectively. The processing system 100 may include, for example, a mobile device, a telephone, a personal digital assistant, a netbook, a laptop computer, a tablet computer, a desktop computer, or any type of computing device capable of running a program, accessing a network, and/or accessing a database in a server that is remotely located with respect to the processing system 100.

While the system of FIG. 1 is used to provide an illustration of a system in which the processor architecture of the present embodiments is implemented, it is understood that the depicted system is not limiting and is intended to provide an example of a suitable computer system in which the techniques of the present embodiments are applied. It should be appreciated that FIG. 1 does not imply any limitations with regard to the environments in which different embodiments may be implemented. Many modifications to the depicted environment may be made based on design and implementation requirements.

FIG. 2 is an operational flowchart illustrating a false load-hit-store detection override process 200 according to at least one embodiment.

Figure 3:
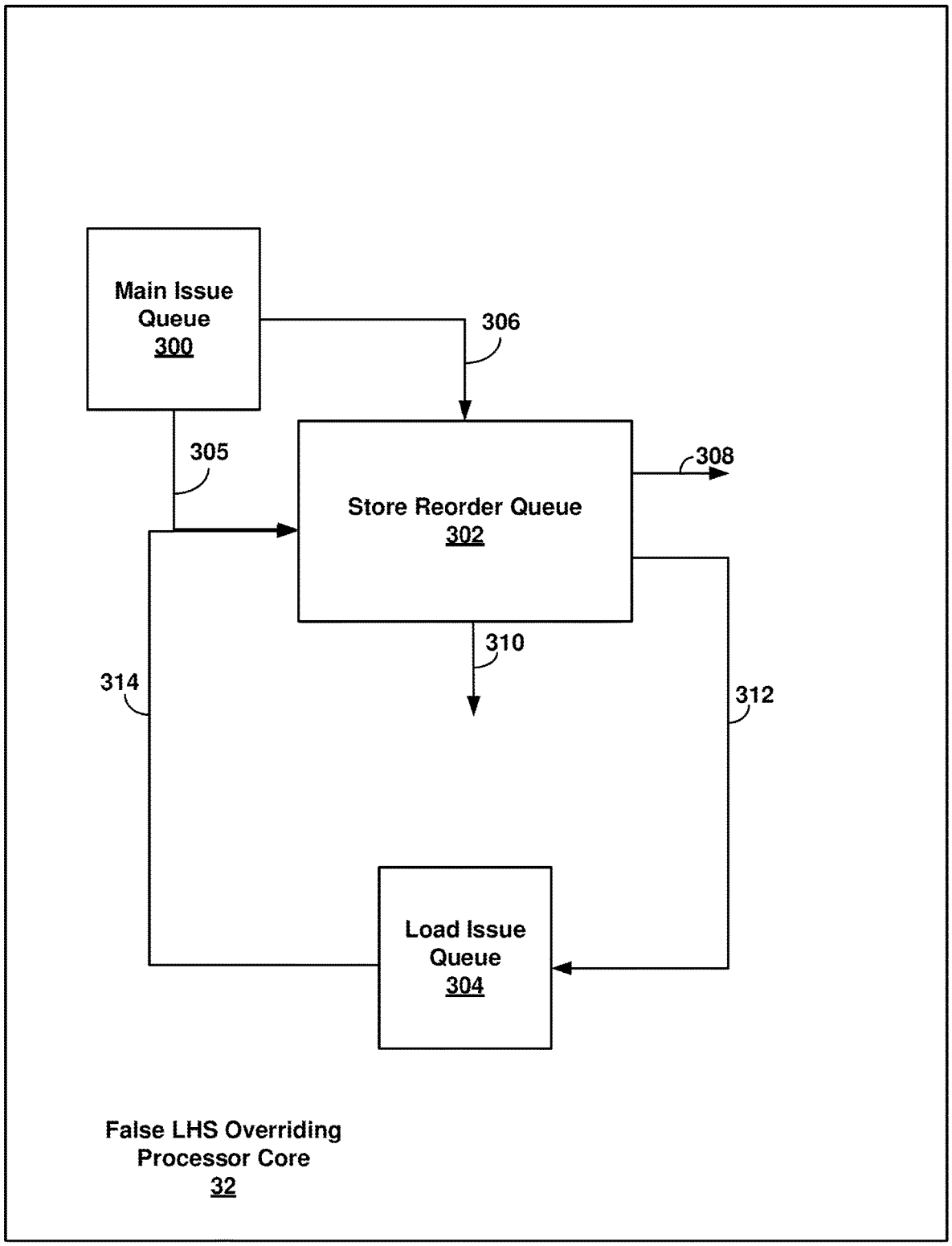
FIG. 3 is a block diagram illustrating portions of a processor core in accordance with at least one embodiment.

FIG. 3 will be described along with FIG. 2 and shows the false LHS overriding processor core 32 that is an example of a processor core that is configured to override false load-hit-store detections and to thereby improve processor speed and processor performance according to the present embodiments. The false LHS overriding processor core 32 may include hardware facilities that include one or more execution units. The execution units may be used to perform the described false load-hit-store override processor operation process. The one or more execution units may be used to execute instructions.

The false LHS overriding processor core 32 may include a single integrated circuit processor such as a superscalar processor, which, includes various execution units, registers, buffers, memories, and other functional units that are all formed by integrated circuitry. The false LHS overriding processor core 32 in at least one embodiment is capable of issuing and executing instructions out-of-order.

The false LHS overriding processor core 32 may include an instruction fetch unit, an instruction decode unit, an instruction issue unit, a load/store unit (LSU), an operand address generation unit, a fixed point unit (or any other execution unit(s)), and other components such as various other execution units, registers, buffers, memories, and other functional units.

The load-store unit may include a store reorder queue 302, a load issue queue 304, and an L1 data cache. The load issue queue 304 and the store reorder queue 302 may each generate and include entries that track additional information associated with outstanding load and store instructions. The load issue queue 304 and the store reorder queue 302 may each be configured to store tags of the instructions.

The instruction fetch unit may fetch instruction codes. For example, the instruction fetch unit may fetch instruction codes stored in an I-cache. The instruction decoding unit may decode these fetched instruction codes into instruction processing data. The instruction decoding unit may include one or more tables configured to store information not limited to the store instruction address(es) and corresponding load tag information. The store instruction addresses may include those that are predicted to cause an out-of-order sequence of operations. Once decoded, the instructions may be dispatched and temporarily placed in an appropriate issue queue such as the main issue queue 300. Dispatched store instructions are marked with an S-tag in ascending order to designate their location in the store reorder queue 302. Dispatched load instructions are marked with an Ltag which designates where they are recorded in the load issue queue 304. The instructions may be held in the main issue queue 300 until all their required operands are available. From the main issue queue 300, instructions may be issued opportunistically to the execution units, e.g., to the load store unit or to an FXU of the processor for execution. The instructions may be issued out-of-order. The instructions may be maintained in the main issue queue 300 until execution of the instructions is complete, and until the result data, if any, are written back, in case any of the instructions needs to be reissued.

During execution within one of the execution units an instruction may receive operands, if any, from one or more architected and/or rename registers within a register file coupled to an execution unit. After an execution unit finishes execution of an instruction, the execution unit may write the result to the designated destination as specified by the instruction and may remove the instruction from the issue queue. The completion of instructions may then be scheduled in program order. The operand address generation unit may generate operand address information for load and store instructions and may write these addresses into the main issue queue 300, into the respective load issue queue 304, and/or into the store reorder queue 302. An FXU may write data values in the store reorder queue 302.

The load store unit may receive load and store instructions from the main issue queue 300 and may execute the load and store instructions. In general, each load instruction may include address information specifying an address of needed data. In at least some embodiments, the load store unit supports out of order executions of load and store instructions, thereby achieving a high level of performance. The load store unit may be pipelined by executing load and store instructions via a set of ordered pipeline stages performed in sequence.

Load instructions may be allocated a respective entry in the load issue queue 304. The load issue queue 304 may save the address of each load after the load executes until completion of load execution. Every store instruction may be allocated an entry in the store reorder queue 302. The store reorder queue 302 may similarly save the respective store address from execution of the store address computation until the store instruction completes and has written data to memory storage such as an L1 data cache.

The load store unit may execute a load instruction and may compare this load instruction to entries in the store reorder queue 302. Through this fast comparison a determination may be made whether store-data-forwarding for the load instruction is able to be performed and whether the load instruction has a load-store-hit against any older store instruction. For example, the load instruction may execute prior to the store data being written for a respective store instruction. The load instruction may set a hazard bit in the store reorder queue entry against which the load instruction compared if the load instruction detected an LHS hazard. The load instruction may also set the same hazard bit in its own entry in the load issue queue 304. In some processors, the store data can be written into a store buffer in addition to the store reorder queue 302.

In a step 202 of the false load-hit-store detection override process 200, a load instruction is received that was rejected due to a false load-hit-store detection.

A load-hit-store, sometimes abbreviated as LHS, is a data dependency in a central processing unit. For this data dependency, a load instruction seeks to retrieve data from a memory location that is also the target of a store operation/instruction. The store instruction seeks to store data at the same memory location. If the store instruction is older than the load instruction in the programming sequence, then the processing unit may then need to wait to execute the load instruction until the store instruction executes and stores the data to that memory location. This waiting allows the correct data to be retrieved by the load instruction from that memory location. This waiting may involve a L1 cache roundtrip, during which execution of the load instruction will be stalled. For processors which can execute instructions out of order, the entire pipeline will not be stalled but the load instruction with the LHS detection will stall. This stalling of the load instruction alone may still decrease performance significantly if the load instruction is one of the oldest instructions in the core and holds up the in-order completion/retirement of all other younger instructions that are active in the core. This stalling of the ability to execute the load instruction with an LHS detection may cause a significant decrease in processing performance.

A processor core of an out-of-order processor chip may include a store reorder queue (SRQ), load-hit-store ordering hazard detection by load instructions against SRQ entries, and store forwarding data from the SRQ to the load instructions. The exemplary false LHS overriding processor core 32 shown in FIG. 3 includes a store reorder queue 302.

In an out-of-order execution processor, store instructions may be speculative when issued to a load-store unit (LSU). The store instructions may also be issued out of order to the load store unit. The store instructions may then be drained out of the store reorder queue 302 of the LSU once they become non-speculative. The store instructions may be drained out one at a time in program order and may be sent to update an L1 and/or an L2 data cache. The respective store instruction may then be deallocated and/or drained from the store reorder queue 302. FIG. 3 shows with a first store instruction stream 306 the store instructions being issued from the main issue queue 300 and being sent to the store reorder queue 302. FIG. 3 shows with a second store instruction stream 310 the store instructions being deallocated and/or drained from the store reorder queue 302. The second store instruction stream 310 may include execution of a store instruction so that data is taken from a register and saved in a memory location.

When a load instruction is issued to the LSU, the load instruction should check the SRQ entries of the store reorder queue 302 to determine if there is any store instruction that is older than this load instruction and that has a matching address where at least one byte of the load access range and at least one byte of the access of the SRQ entry overlap. FIG. 3 shows with a first load instruction stream 305 a load instruction issuing from a main issue queue 300 and passing to the store reorder queue 302 in order to perform this checking. If the load instruction address matches any SRQ entry address, the load instruction does not read data from the L1 or L2 data cache immediately or else the data may be stale and/or not up-to-date. Instead, the load instruction has traditionally waited for the matching SRQ entry to drain to the L1 or L2 data cache. Alternatively, in some cases, the SRQ has forwarded the data from the matching entry directly to the load execution pipe. This forwarding may be referred to as store forwarding and is a follow on extension to load-hit-store detection. When a load instruction detects LHS against one or more SRQ entries, the logic determines which SRQ entry is the youngest entry that is older than the load instruction. If that store entry provides all of the bytes that are required by the load instruction, then that SRQ entry data can be read out of the SRQ and forwarded directly to the load result.

SRQ entries may each include an s-tag. The s-tag is an abbreviation for store tag and may indicate the position in the sequence that the respective store instruction has with respect to other store instructions. Every store instruction may be stamped with an s-tag in an issue queue in an ascending order of the program sequence. A number for the s-tag may range amongst the number of store instructions that the store reorder queue 302 is physically able to hold. A circular mechanism may be used for selecting a number for the s-tag, whereby as a particular store instruction is drained from the store reorder queue 302 then the corresponding s-tag used by the drained instruction may be freed up and used for another new store instruction. The main issue queue 300 may send the s-tag to the store reorder queue 302 along with the respective store instruction to guide the store reorder queue 302 as to where/how in the store reorder queue 302 the respective store instruction should be written and eventually executed.

The load instruction may compare its address against all store instructions in the store reorder queue 302 that are older than the load instruction. This consideration of being older may refer to a position of the particular instruction in the order/sequence of the execution of the programming code as opposed to mere time chronology. Thus, in this view an A instruction which is to be executed before a B instruction during operation of a program with programming code may be considered to be older than the B instruction. Any store instruction that is younger than the load instruction would not represent a threat of a load-hit-store dependency for this particular load instruction.

A load-hit-store may be determined based on partial effective address matching in order to achieve improved processing speeds. A load-hit-store detection based on a partial effective address is used to drive the critical reading of store forward data out of the store reorder queue 302 onto a load result bus. In parallel to the timing-critical read of the store forward data onto the load result bus, a more thorough check of the translated full real address of the load instruction is performed against the full real address of the store instruction whose entry in the store reorder queue 302 was hit in the LHS. This more thorough check is done to ensure that the load instruction and the store instruction truly match. The full address of the load instruction and the full address of the store instruction not fully matching and only partially matching is a false load-hit-store condition and requires the load instruction to be handled in a special way. False load-hit-stores often incur a performance penalty, as an unnecessary delay was thereby generated. For a full address of (0:63), the partial range (40:63) which are lower level bits may be sent to the store reorder queue 302 to reduce memory size of the transmitted component and to simplify data comparison. The full address that includes the upper level bits (0:39) may be checked later for confirming a full address match.

An example of a partial address hit is represented with the following example for a load instruction "LD" and a store instruction "ST (stag X+1)".

ST (stag X+1): EA(0:39)=0x0000_0000_01, EA(40:63)= 0x00_00010, size=8 bytes

LD: EA(0:39)=0x0000_0000_00, EA(40:63)= 0x00_000C, size=8 bytes

The quick search may indicate a match of the partial addresses; however, the full address search may then indicate that the addresses do not fully match so that a dependency of the load instruction on the store instruction is not proper. The quick search may show a match of EA(40:63) and that both instructions use eight bytes. Thus, the quick search may look at byte size and location to help determine a partial match. Using hexadecimal numbering system, the C location for the load instruction means that the load instruction is looking to retrieve data from the eight bytes starting from the twelfth spot, e.g., looking for bytes from the $12^{th}$ through $19^{th}$ spots. Also using the hexadecimal language, the "10" location in this store instruction means that the store instruction is storing to eight bytes starting from the sixteenth spot, e.g., is storing to bytes from the $16^{th}$ through $23^{rd}$ spots. Thus, this overlap of the $16^{th}$, $17^{th}$, $18^{th}$, and the $19^{th}$ data spots results in an initial detection of a load-hit-store.

The further investigation of the EA(0:39) portion of the address indicates that these two instructions do not have a full address match. Thus, the initial load-hit-store detection that was determined is a false load-hit-store and this load instruction may be rejected. This dichotomy may be explained with an analogy of comparing memory storage locations to a multi-drawer dresser (furniture), whereby each drawer has matching compartments. If the two instructions that are being compared both are seeking to access a right back corner compartment (partial address match), but the full comparison revealed that these two right back corner compartments were in an entirely different drawer (full address does not match), then the match of the partial address is irrelevant and the impacted data will not be the same. Thus, the load-hit-store was a false alarm and there is no need to delay this load instruction until this store instruction executes.

In some embodiments, an L1 data cache index and L1 data cache way are stored in the store reorder queue 302 and compared against the L1 data cache index and L1 data cache way of the load instruction in order to check the full address. The L1 index and way are pointers to the L1 data cache directory and are representative of a full real address. The index and way combination may be implemented in instances when the L1 data cache has data storage occurring two dimensionally. For example, the L1 index and way may be a proxy for the effective address upper level bits (0:39).

When a false load-hit-store detection is detected, the issued first load instruction is rejected and is sent back to the issue queue. The second load instruction stream 312 shown in FIG. 3 is a pathway via which a rejected load instruction may be sent back to a load issue queue 304. The receiving of step 202 may refer to this load issue queue 304 receiving the load instruction that has been rejected. The load issue queue 304 may be a load instruction issue queue that is local to the load store unit. This local load issue queue may be referred to as a load launch queue (LLQ).

In an alternative embodiment, the rejected load instruction may be sent back to the main issue queue 300 also known as the main core issue queue. In this alternative embodiment, the tasks described below as being performed by the load issue queue 304 would be performed by the main core issue queue.

As part of the rejection of the load instruction, information about the store instruction that was part of the false load-store-hit detection may be sent in a stream from the store reorder queue 302 to the load issue queue 304 or may be attached to the rejected load instruction and transmitted with the rejected load instruction in the second load instruction stream 312 to the load issue queue 304. This information may be recorded at the load issue queue 304 or in the alternative embodiment at the main issue queue 300. This information may include a false LHS valid indication, which means that a false load-hit-store was detected for this load instruction. This information may also include a False LHS S-tag value, which indicates the identifier for the problematic store instruction which caused the false load-hit-store detection for this load instruction. This information may be recorded in a tracking structure of the respective issue queue, e.g., in a tracking structure of the load issue queue 304. In the above specific example, information that the store instruction was listed as stag X+1 in the store reorder queue 302 may be transmitted back to the load issue queue 304.

In a step 204 of the false load-hit-store detection override process 200, a warning label is generated regarding the false load-hit-store detection. The false load-hit-store detection may be that detection which caused the rejection of the first load instruction that was received in step 202.

The warning label may include a first information section which may indicate generally that this load instruction was rejected due to a false load-hit-store detection involving this load instruction. This first information section may in one example include the characters and words: "Block LHS Valid". The words "INHIBIT", "FORCE MISMATCH", etc. may be chosen in place of "Block". The word "Block" or other comparable word may be added to help delineate between the signals sent from the store reorder queue 302 to the load issue queue 304 upon the initial rejection and the signals to be sent from the load issue queue 304 to the store reorder queue 302 upon reissuance of the labeled load instruction.

The warning label may include a second information section which identifies the store instruction which was involved with the rejected load instruction in the false load-hit-store detection. This identification may include specifying the name, address, and/or identifying tag of that store instruction. If the store instruction involved in the first false load-hit-store detection had an s-tag of (0:5) in the store reorder queue 302, this second information section may in one example include the characters and words: "Block LHS Stag (0:5)". Following the above example where "X+1" was given as the s-tag for the problematic store instruction, the second information section for this case may be "Block LHS Stag (X+1)".

This warning label may be generated at the load issue queue 304 or at the main core issue queue. Information that was received regarding the rejection of the load instruction may be used to generate the warning label.

The multiple information sections of the warning label may be a straight reflection of the fields stored in the respective issue queue, e.g., in the load issue queue 304, related to the information received about the false load-hit-store detection.

In a step 206 of the false load-hit-store detection override process 200, the warning label is added to the load instruction. The warning label may be that warning label which was generated in step 204. The load instruction may be that rejected load instruction which was received in step 202. The warning label may be attached to the load instruction in preparation for reissue of the load instruction.

The adding of step 206 may be performed at or by the load issue queue 304. The load issue queue 304 may be local to the load store unit. In some embodiments, a local load issue queue, e.g., the load issue queue 304, may be referred to as a load launch queue (LLQ). Implementing a local issue queue specific for load instructions may be advantageous as bits may be added specifically to load instructions. Use of the main issue queue 300 to perform the adding may result in an unused field for types of instructions other than the load instructions.

The adding of step 206 may be performed by adding the information sections as bits to the respective load instruction.

In a step 208 of the false load-hit-store detection override process 200, the labeled load instruction is reissued. This labeled load instruction may be that load instruction that was received in step 202 and to which the warning label was added in step 206. Steps 202, 204, 206, and 208 may be performed without delay so that the reissuance of the labeled load instruction is said to occur immediately after the load instruction is received. The load issue queue 304, or alternatively when no local load issue queue is used a main processor core issue queue, may perform this first reissuing of the load instruction which is now labeled with a false load-hit-store warning label that is specific to the store instruction involved in the false load-hit-store detection. The issued labeled load instruction may be transmitted in a third load instruction stream 314 to the store reorder queue 302 so that the issued labeled load instruction is enabled to further check against all store instruction entries in the store reorder queue 302 for memory location overlap.

The issued labeled load instruction is issued such that when this load instruction searches through the store reorder queue 302 for possible load-hit-stores, the warning label causes the labeled first load instruction to bypass that problematic store instruction which caused the first false load-hit-store detection. This bypass occurs in the store reorder queue 302. This bypass helps avoid another false load-hit-store detection with the same store instruction. Following the above examples, the label helps the reissued load instruction to bypass the LHS S-tag (0:5) or in the other example the LHS S-tag X+1.

When the labeled load instruction is reissued, the label helps the load instruction to remember the SRQ entry which caused the false load-hit-store detection. The label will force a miss against that SRQ entry to allow the load instruction to proceed further and check against other older store instructions and/or to be executed and return data from an L1 data cache or from an L2 data cache, without having to wait for the falsely-matching SRQ entry to drain from the store reorder queue 302.

In one embodiment, the first information section "Block LHS Valid=1" in conjunction with the second information section "Block LHS Stag=X+1" will cause the load-hit-store detection logic within the store reorder queue 302 to treat the SRQ entry for X+1 as if this entry is invalid. This reading of invalidity will force the reissued labeled load instruction to skip this X+1 entry so that the reissued labeled load instruction compares itself against other older entries in the store reorder queue 302. Thus, this skip or bypass will allow the load instruction to proceed and, if clear from the other SRQ entries, read data from the L1 data cache, initiate a request to an L2 data, and take that data and transfer the data to a register file.

A load instruction may traditionally use itag analysis of store instructions to identify which store instructions in the store reorder queue 302 may represent a potential load-hit-store dependency. Itags may be stamped to an instruction at dispatch time when being sent into the issue queue to help order the instructions in a correct sequence for executing the programming code. During the check against entries in the store reorder queue 302, the load instruction may ignore all store instructions with an itag that is later in sequence than an itag of the load instruction. Such a later itag may indicate that the load-hit-store dependency is not possible for the store instruction with that later itag. In some embodiments, the warning label generated in step 204 and attached and/or added to the load instruction in step 206 may use itag intended misinterpretation to cause the load instruction to skip the problematic store instruction. The warning label may alter the itag reading for the itag of the load instruction so that the load instruction believes that its own order placement starts before the order placement of the problematic store instruction. The warning label may additionally or alternatively cause the load instruction to make a false itag reading of the problematic store instruction so that the load instruction falsely interprets the itag of the problematic store instruction to be after the itag of the load instruction in the programming code sequence. This itag misinterpretation may help the reissued load instruction bypass the problematic store instruction in the store reorder queue 302.

When a load instruction is sent through the store reorder queue 302 for checking for LHS dependencies, the load instruction generates a vector that includes entries for all store instructions that could cause a possible load-hit-store. Thus, store instructions that are older (in the programming sequence) than the load instruction may be in this vector. The block action according to the present embodiments may prevent the problematic store instruction from being entered into this vector for comparison to the load instruction. The problematic store instruction may be made to appear younger (in the programming sequence) than the load instruction is or the load instruction may be made to appear older (in the programming sequence) than the problematic store instruction is. Thus, the block function may include generating a fake programming location sequence for the load instruction and/or for the problematic store instruction.

In a step 210 of the false load-hit-store detection override process 200, a determination is made as to whether any false load-hit-store detection occurs for an older store instruction. This determination of step 210 may be performed repeating the precursor steps described above which led to the initial load store instruction being rejected due to a false load-hit-store detection. The older store instruction may refer to any store instructions recorded in the store reorder queue 302 that is older than the first store instruction which triggered the first false load-hit-store detection that caused the rejection of the load instruction that was received in step 202. This consideration of being older may refer to a position of the particular instruction in the order/sequence of the execution of the programming code as opposed to mere time chronology. Thus, in this view an A instruction which is to be executed before a B instruction during operation of a program with programming code may be considered to be older than the B instruction.

The determination of step 210 may be made based on partial effective address matching in order to achieve improved processing speeds. A load-hit-store detection based on a partial effective address is used to drive the critical reading of store forward data out of the store reorder queue 302 onto a load result bus. In parallel to the timing-critical read of the store forward data onto the load result bus, a more thorough check of the translated full real address of the load instruction is performed against the full real address of the store instruction whose entry in the store reorder queue 302 was hit in the LHS. This more thorough check is done to ensure that the load instruction and the store instruction truly match. The full address of the load instruction and the full address of the store instruction not fully matching and only partially matching is a false load-hit-store condition and requires the load instruction to be handled in a special way.

An example of a partial address hit is represented building on the example provided previously with the load instruction "LD", the store instruction "ST (stag X+1)", and now with an older store instruction "ST (stag X)".

ST (stag X): EA(0:39)=0x0000_0000_01, EA(40:63)= 0x00_00008, size=8 bytes

ST (stag X+1): EA(0:39)=0x0000_0000_01, EA(40:63)= 0x00_00010, size=8 bytes

LD: EA(0:39)=0x0000_0000_00, EA(40:63)= 0x00_000C, size=8 bytes

The quick search may indicate a match of the partial addresses for this older store instruction indicated by stag X and for the load instruction; however, the full address search may then indicate that the addresses do not fully match so that a dependency of the load instruction on this store instruction is not proper. The quick search may show a match of EA(40:63) and that both instructions use eight bytes. Thus, the quick search may look at byte size and location to help determine a partial match. Using hexadecimal numbering system, the C location for the load instruction means that the load instruction is looking for the eight bytes starting from the twelfth spot, e.g., looking for bytes from the $12^{th}$ through $19^{th}$ spots. The "8" location in this older store instruction means that the older store instruction is storing to eight bytes starting from the eighth spot, e.g., for bytes from the $8^{th}$ through the $15^{th}$ spots. Thus, this older store instruction has some overlap with this load instruction at the $12^{th}$, $13^{th}$, $14^{th}$, and $15^{th}$ spots and an initial determination of a load-hit-store is generated.

In this embodiment, the stag X instruction is also the next instruction before the stag X+1 instruction in the programming sequence, so that these two store instructions (X and X+1) are consecutive.

The further investigation of the EA(0:39) portion of the addresses indicates that the load instruction and the older store instruction do not have a full address match. Thus, the initial load-hit-store detection that was determined is another false load-hit-store and this load instruction may again be rejected. The partial match was irrelevant, as the data locations needed for the two instructions in reality were not covering the same data spots.

In some embodiments, an L1 data cache index and L1 data cache way for respective store instructions are stored in the store reorder queue 302 and compared against the L1 data cache index and against the L1 data cache way of the load instruction. This L1 index and way comparison may be an alternative way to compare full addresses.

The older store instruction causing the additional false load-hit-store detection may be, with respect to a sequence of a programming order of the code being executed, consecutive with respect to a first store instruction which caused the initial rejection of this load instruction due to a first false load-hit-store detection.

If the determination of step 210 is negative in that no false load-hit-store occurs for the entries in the store reorder queue 302 with respect to the reissued load instruction that is labeled, then the false load-hit-store detection override process 200 may proceed to step 212.

If the determination of step 210 is affirmative in that a false load-hit-store detection occurs amongst the older store instructions entered in the store reorder queue 302 with respect to the reissued load instruction that is labeled, then the false load-hit-store detection override process 200 may proceed to step 214.

In a step 212 of the false load-hit-store detection override process 200, the load instruction is executed. This execution may occur with the load instruction retrieving data from a memory location, e.g., in the L1 data cache or in an L2 data cache, and loading this retrieved data into a register file.

In this branch of the false load-hit-store detection override process 200, the false load-hit-store detection override process 200 may end after completion of the step 212 with the load instruction being executed. The false load-hit-store detection override process 200 may be repeated for other load instructions in the code that is being executed by the false LHS overriding processor core 32. The false load-hit-store detection override process 200 may continue until no more instructions are available to fetch and/or to evaluate from the software code.

In a step 214 of the false load-hit-store detection override process 200, the load instruction is sent back to the issue queue. This issue queue may be the load issue queue 304. This step 214 is performed in the branch of the false load-hit-store detection override process 200 that is alternative to the branch that includes step 212. This sending back of step 214 may be considered as being part of a second rejection for this particular load instruction. This second rejection is due to another false load-hit-store detection with respect to a store instruction which is older than the store instruction which caused the first rejection of this load instruction. In an alternative embodiment, the rejected load instruction may be sent back to the main issue queue 300 if the implementation includes no load issue queue 304.

The second-time rejected load instruction may be sent back to the load issue queue 304 via the second load instruction stream 312 that was shown in FIG. 3 and via which the first rejected load instruction traveled to the load issue queue 304 after being rejected. As part of this sending back, information about the store instruction that was part of this second or further false load-store-hit detection may be sent in a separate information stream from the store reorder queue 302 to the load issue queue 304 (or to the main issue queue 300 in the alternative embodiment that lacks the load issue queue 304). The store instruction information may additionally or alternatively be attached to the rejected load instruction and transmitted with the rejected load instruction in the second load instruction stream 312 back to the load issue queue 304. For example, information that another false load-hit-store detection occurred may be transmitted back to the load issue queue 304. Also, information that the problematic store instruction was listed as stag X in the store reorder queue 302 may be transmitted back to the load issue queue 304. This information may be sent to indicate that this false load-hit-store detection was the second one that has occurred for this particular load instruction. This new information may be sent along with the information that was passed as a result of the first load-hit-store detection, or that information from the first rejection may be held at the load issue queue 304. The new information may also indicate that this new problematic store instruction causing this further false load-hit-store detection has an s-tag number that is one less than the s-tag number of the first problematic store instruction which caused the first false load-hit-store detection.

In a step 216 of the false load-hit-store detection override process 200, an additional label for the further false load-hit-store detection is generated and added. This additional label may relate to the further and older store instruction which caused the second false load-hit-store detection. This adding may be in the way of adding a third information section that is added to this particular load instruction. This third information section may supplement the first information section and the second information section which were generated in step 204 and which were added to this load instruction in step 206. This third information section may be entered into a field of the load instruction which is left blank during the adding in step 206 and the reissuing of step 208 with respect to the first reissuance.

In at least some embodiments, the older store instruction causing this further false load-hit-store detection is consecutive in the programming order as compared to the first store instruction which caused initial rejection of this particular load instruction during execution of the programming code. In this embodiment, the older store instruction may be referred to as an X store instruction compared to the first problematic store instruction which may be referred to as the X+1 store instruction. This third information section may for example include characters and words of "Block LHS Minus1", where the Minus1 refers to an s-tag address that is one before, i.e., one older than, the s-tag address that was entered in the second information section.

In a step 218 of the false load-hit-store detection override process 200, a further labeled load instruction is issued and executed.

The load issue queue 304, or alternatively when no local load issue queue is used a main processor core issue queue, may perform this issuing of step 218 for the additionally-labeled load instruction. The issued additionally-labeled load instruction may be transmitted in the third load instruction stream 314 to the store reorder queue 302 so that the issued additionally-labeled load instruction is enabled to check against all other store instruction entries in the store reorder queue 302 for memory location overlap. This further label along with the original label allows the once-again issued further labeled instruction to bypass the second problematic store instruction in the store reorder queue 302 and thereby avoid another false load-hit-store detection with the second problematic store instruction. The original label allows the once-again issued further labeled instruction to bypass the first problematic store instruction in the store reorder queue 302 and thereby avoid another false load-hit-store detection with this first problematic store instruction.

When the additionally-labeled load instruction is reissued, the additional label helps the load instruction to remember the SRQ entry which caused the second false load-hit-store detection. The label will force a miss against that SRQ entry to allow the load instruction to proceed further and check against other older store instructions and/or to be executed and return data from an L1 data cache or from an L2 data cache, without having to wait for the second falsely-matching SRQ entry to drain from the store reorder queue 302.

The third information section may cause the load-hit-store detection logic within the store reorder queue 302 to treat the SRQ entry as if this entry is invalid. This reading of invalidity will force the reissued labeled load instruction to skip this entry so that the reissued labeled load instruction compares itself against other older entries in the store reorder queue 302. Thus, this skip will allow the load instruction to proceed and, if clear from the other SRQ entries, read data from the L1 data cache, initiate a request to an L2 data, and take that data and transfer the data to a register file.

A load instruction may traditionally use itag analysis of store instructions to identify which store instructions in the store reorder queue 302 may represent a potential load-hit-store dependency. In some embodiments, the further warning label generated and added to the load instruction in step 216 may use itag intended misinterpretation to cause the load instruction to skip the first and the second problematic store instructions. The additional warning label may alter the itag reading of the load instruction for the itag of the load instruction so that the load instruction believes that its own placement in the programming order starts before the programming sequence positioning of the second problematic store instruction. The warning label may alternatively cause the load instruction to make a false itag reading of the second problematic store instruction so that the load instruction falsely interprets the itag of the second problematic store instruction to be after the itag of the load instruction in the programming code sequence. This itag misinterpretation may help the reissued load instruction bypass the second problematic store instruction in the store reorder queue 302. This intended misinterpretation for the second problematic store instruction may be performed in addition to the intended misinterpretation for the first problematic store instruction.

When a load instruction is sent through to the store reorder queue 302 for checking for LHS dependencies, the load instruction generates a vector that includes entries for all store instructions that could cause a possible load-hit-store. Thus, store instructions that are older (in the programming sequence) than the load instruction may be in this vector. The block action for the false LHS detection of X may prevent the second problematic store instruction from being entered into this vector for comparison to the load instruction. The second problematic store instruction may be made to appear younger (in the programming sequence) than the load instruction is or the load instruction may be made to appear older (in the programming sequence) than the store instruction is. Thus, the block function may include generating a fake programming location sequence for the second problematic store instruction.

With this bypass of the second problematic store instruction, the twice reissued load instruction is free to check all older store instructions in the store reorder queue 302 for possible LHS and if clear on that basis to execute the load instruction by retrieving data from a memory location and loading that data into a register file of the false LHS overriding processor core 32.

In this branch of the false load-hit-store detection override process 200, the false load-hit-store detection override process 200 may end after completion of the step 218 with the load instruction being executed. The false load-hit-store detection override process 200 may be repeated for other load instructions in the code that is being executed by the false LHS overriding processor core 32. The false load-hit-store detection override process 200 may continue until no more instructions are available to fetch and/or to evaluate from the software code.

It may be appreciated that FIGS. 2 and 3 provide only illustrations of some embodiments and do not imply any limitations with regard to how different embodiments may be implemented. Many modifications to the depicted embodiment(s), e.g., to a depicted sequence of steps or arrangement of processor components, may be made based on design and implementation requirements.

Figure 4:
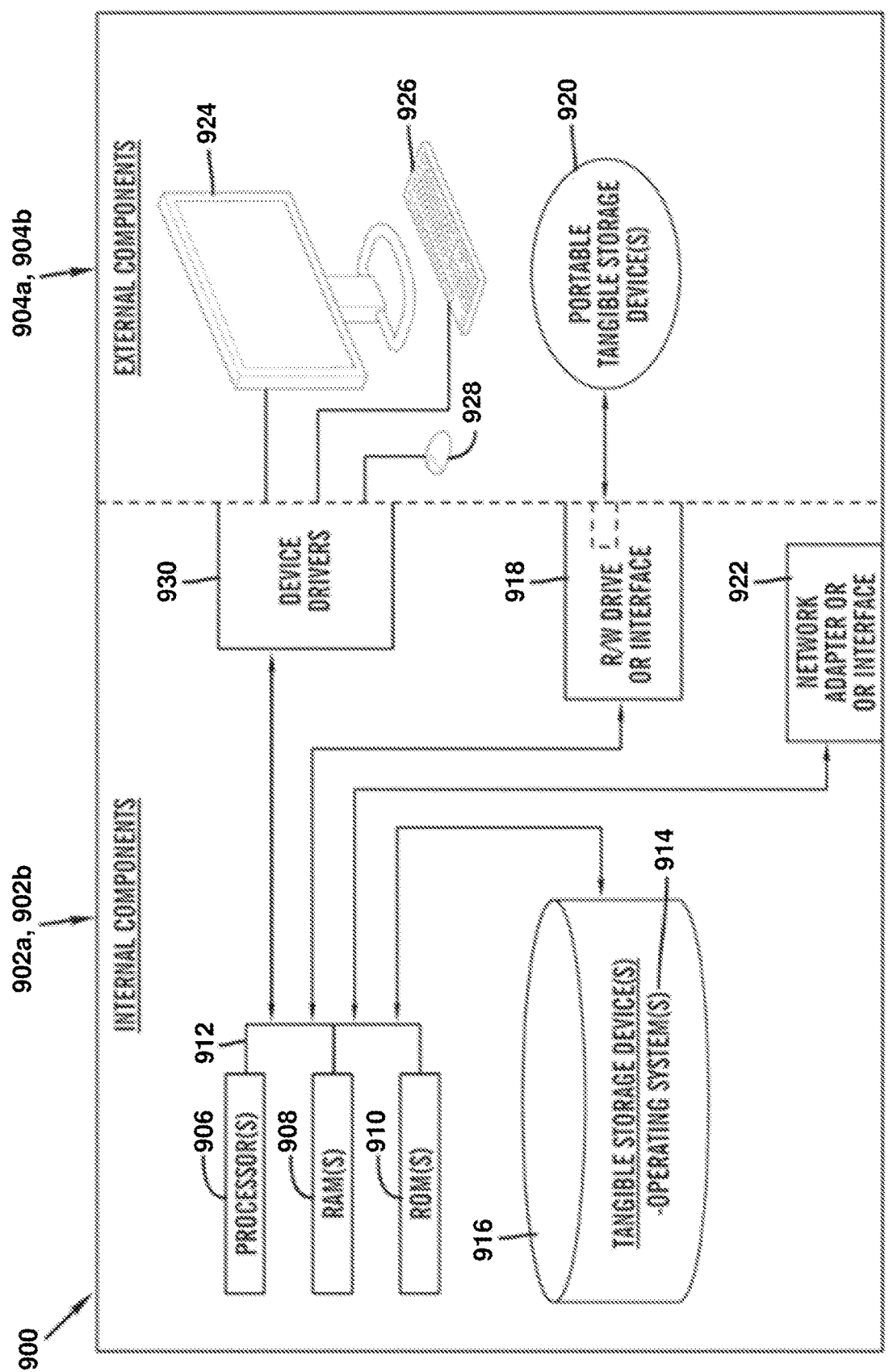
FIG. 4 is a block diagram of internal and external components of a computer system according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more processors 906 may be a false LHS overriding processor core 32. The one or more operating systems 914 may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program can be stored on one or more of the respective portable computer-readable tangible storage devices 920, read via the respective R/W drive or interface 918 and loaded into the computer-readable tangible storage device 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. Software for being executed or ran by the one or more processors 906 may be downloaded from an external computer (e.g., server) via a network (for example, the Internet, a local area network or other, wide area network) and respective network adapters or interfaces 922. From the network adapters (or switch port adaptors) or interfaces 922, such software programs may be loaded into the computer-readable tangible storage device 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in computer-readable tangible storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operation of a processor core, the method comprising:
   receiving a rejected first load instruction, wherein the rejected first load instruction has been rejected due to a false load-hit-store detection against a first store instruction;
   generating a warning label in response to receiving the false load-hit-store detection;
   adding the warning label to the received first load instruction to create a labeled first load instruction; and
   issuing the labeled first load instruction such that the warning label causes the labeled first load instruction to bypass the first store instruction in a store reorder queue and thereby avoid another false load-hit-store detection against the first store instruction.

2. The method of claim 1, wherein the warning label comprises an identifier of the first store instruction.

3. The method of claim 1, wherein the false load-hit-store detection occurs due to a partial address of the first load instruction matching a partial address of the first store instruction and a full address of the first load instruction not matching a full address of the first store instruction.

4. The method of claim 1, wherein the issuing of the labeled first load instruction occurs before the first store instruction drains from the store reorder queue.

5. The method of claim 1, wherein the issuing of the labeled first load instruction occurs from a main core issue queue.

6. The method of claim 1, wherein the issuing of the labeled first load instruction occurs from a load instruction issue queue local to a load store unit.

7. The method of claim 1, further comprising executing the issued labeled first load instruction.

8. The method of claim 1, wherein the warning label implements instruction age misinterpretation to cause the labeled first load instruction to bypass the first store instruction in the store reorder queue.

9. The method of claim 1, further comprising receiving the issued labeled first load instruction after the issued labeled first load instruction is further rejected due to a false load-hit-store detection against a second store instruction;
    generating a further warning label on a basis of the second store instruction;
    adding the further warning label to the labeled first load instruction so that a further labeled first load instruction is created; and
    issuing the further labeled first load instruction such that the further warning label causes the issued further labeled first load instruction to bypass the second store instruction in the store reorder queue and thereby avoid another false load-hit-store detection against the second store instruction.

10. The method of claim 9, wherein the second store instruction is a next older instruction than the first store instruction in a program sequence.

11. The method of claim 9, wherein the further warning label comprises an identifier of the second store instruction.

12. The method of claim 9, further comprising executing the issued further labeled first load instruction.

13. The method of claim 9, wherein the further warning implements instruction age misinterpretation to cause the issued further labeled first load instruction to bypass the second store instruction in the store reorder queue.

14. A computer system comprising one or more processors and one or more computer-readable memories, wherein a first processor of the one or more processors comprises a processor core configured to perform a method comprising:
    receiving a rejected first load instruction, wherein the rejected first load instruction has been rejected due to a false load-hit-store detection against a first store instruction;
    generating a warning label in response to receiving the false load-hit-store detection;
    adding the warning label to the received first load instruction to create a labeled first load instruction; and
    issuing the labeled first load instruction such that the warning label causes the labeled first load instruction to bypass the first store instruction in a store reorder queue and thereby avoid another false load-hit-store detection against the first store instruction.

15. The computer system of claim 14, wherein the warning label comprises an identifier of the first store instruction.

16. The computer system of claim 14, wherein the false load-hit-store detection occurs due to a partial address of the first load instruction matching a partial address of the first store instruction and a full address of the first load instruction not matching a full address of the first store instruction.

17. The computer system of claim 14, wherein the warning label implements instruction age misinterpretation to cause the labeled first load instruction to bypass the first store instruction in the store reorder queue.

18. A processor core comprising one or more hardware facilities comprising at least one execution unit for executing instructions, wherein the processor core is capable of performing a method comprising:
    receiving a rejected first load instruction, wherein the rejected first load instruction has been rejected due to a false load-hit-store detection against a first store instruction;
    generating a warning label in response to receiving the false load-hit-store detection;
    adding the warning label to the received first load instruction to create a labeled first load instruction; and
    issuing the labeled first load instruction such that the warning label causes the labeled first load instruction to bypass the first store instruction in a store reorder queue and thereby avoid another false load-hit-store detection against the first store instruction.

19. The processor core of claim 18, wherein the warning label comprises an identifier of the first store instruction.

20. The processor core of claim 18, wherein the warning label implements instruction age misinterpretation to cause the labeled first load instruction to bypass the first store instruction in the store reorder queue.

\* \* \* \* \*